US008968920B2

(12) United States Patent
Lee et al.

(10) Patent No.: US 8,968,920 B2
(45) Date of Patent: Mar. 3, 2015

(54) ORGANIC ELECTROLYTE SOLUTION INCLUDING SILANE COMPOUND AND LITHIUM BATTERY EMPLOYING THE SAME

(75) Inventors: Seok-soo Lee, Suwon-si (KR); Young-gyoon Ryu, Suwon-si (KR); Han-su Kim, Seoul (KR); Nina K. Gusarova, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1967 days.

(21) Appl. No.: 11/848,919

(22) Filed: Aug. 31, 2007

(65) Prior Publication Data

US 2008/0063937 A1  Mar. 13, 2008

(30) Foreign Application Priority Data

Sep. 4, 2006  (KR) .................. 10-2006-0084818

(51) Int. Cl.
| | |
|---|---|
| *H01M 6/16* | (2006.01) |
| *H01M 10/0567* | (2010.01) |
| *C07F 7/04* | (2006.01) |
| *H01M 10/0525* | (2010.01) |

(52) U.S. Cl.
CPC ...... *H01M 10/0567* (2013.01); *H01M 2220/30* (2013.01); *H01M 6/168* (2013.01); *H01M 10/0525* (2013.01); *Y02E 60/122* (2013.01)
USPC .......... 429/188; 252/62.2; 429/338; 556/464; 556/443

(58) Field of Classification Search
CPC ............... H01M 6/162–6/168; H01M 10/056; H01M 10/0564; H01M 10/0566–10/0569; C07F 7/00–7/04

USPC ........... 429/188, 338; 556/443, 464; 252/62.2
See application file for complete search history.

(56) References Cited

U.S. PATENT DOCUMENTS

| | | | |
|---|---|---|---|
| 4,148,773 A * | 4/1979 | Mark et al. .................... | 524/261 |
| 5,352,548 A | 10/1994 | Fujimoto et al. | |
| 5,712,059 A | 1/1998 | Barker et al. | |

(Continued)

FOREIGN PATENT DOCUMENTS

| | | |
|---|---|---|
| CN | 1238333 A | 12/1999 |
| JP | 06-136031 | 5/1994 |

(Continued)

OTHER PUBLICATIONS

CAS Citation for Laine et al., "Synthesis of pentacoordinate silicon complexes from silicon dioxide", Nature (London, United Kingdom) (1991), 353(6345), 642-4.*

(Continued)

*Primary Examiner* — Edu E Enin-Okut
(74) *Attorney, Agent, or Firm* — Chrisrie, Parker & Hale, LLP

(57) ABSTRACT

Organic electrolyte solutions and lithium batteries employing the same are provided. In one embodiment, an organic electrolyte solution includes a silane compound. The inventive organic electrolyte solutions prevent crack formation caused by volumetric changes in the anode active material during charging/discharging of the battery. This improves charge/discharge characteristics, resulting in improved battery stability, reliability, and charge/discharge efficiency, which is a dramatic improvement over conventional organic electrolyte solutions, which have higher irreversible capacities due to the decomposition of polar solvents.

13 Claims, 4 Drawing Sheets

(56) References Cited

U.S. PATENT DOCUMENTS

| | | |
|---|---|---|
| 5,714,281 A | 2/1998 | Naruse et al. |
| 5,786,493 A | 7/1998 | Rauleder et al. |
| 6,440,876 B1 * | 8/2002 | Wang et al. ............. 438/778 |
| 7,588,859 B1 * | 9/2009 | Oh et al. ................. 429/188 |
| 2002/0012850 A1 | 1/2002 | Schmidt et al. |

FOREIGN PATENT DOCUMENTS

| | | |
|---|---|---|
| KR | 10-1999-0053023 | 7/1999 |
| KR | 2001-0011330 | 2/2001 |
| KR | 10-2001-0090406 | 10/2001 |
| KR | 10-2004-0020633 | 3/2004 |

OTHER PUBLICATIONS

CAS Citation for Staudinger et al., "Attempts to prepare polymeric esters of silicic acid", Makromolekulare Chemie (1953), 11, 24-50.*

CAS Citation for Musavirov et al., "Synthesis and structure of 2,2-dialkoxy-1,3-dioxa-2-silacyclohexanes", Zhurnal Obshchei Khimii (1984), 54(5), 1130-4.*

SIPO Office action dated Mar. 30, 2010, for corresponding Chinese application 200710147198.6.

SIPO Office action dated Aug. 3, 2010, for corresponding Chinese Patent application 200710147198.6 with English translation.

Korean Patent Abstracts, Publication No. 1020010011330 A, Published on Feb. 15, 2001, in the name of Do, et al.

Korean Patent Abstracts, Publication No. 1020040020633 A, Published on Mar. 9, 2004, in the name of Lee.

Megahed, et al., "Lithium-ion rechargeable batteries," Journal of Power Sources, 51 (1994) pp. 79-104.

Song, J.H, et al., *Synthesis of Bishydroxyl Tetracoordinate Silicon*, Chinese Journal of Organic Chemistry, vol. 22, No. 10, (2002), pp. 773-774 with English abstract.

SIPO Office action dated Oct. 16, 2009, for corresponding Chinese application 200710147198.6, with English translation, noting listed references in this IDS.

SIPO Office action dated Apr. 29, 2011, for corresponding Chinese Patent application 200710147198.6, with English translation, 7 pages.

KIPO Office action dated Jul. 25, 2007, for Korean priority Patent application 10-2008-0084818, noting listed references in this IDS, as well as KR 10-2001-0110330, previously submitted in an IDS dated Aug. 30, 2007, 4 pages.

SIPO Certificate of Patent dated Jan. 18, 2012, for corresponding Chinese Patent application 200710147198.6, 27 pages.

* cited by examiner

ORGANIC ELECTROLYTE SOLUTION INCLUDING SILANE COMPOUND AND LITHIUM BATTERY EMPLOYING THE SAME

CROSS-REFERENCE TO RELATED PATENT APPLICATION

This application claims priority to and the benefit of Korean Patent Application No. 10-2006-0084818, filed on Sep. 4, 2006 in the Korean Intellectual Property Office, the entire content of which is incorporated herein by reference.

BACKGROUND OF THE INVENTION

1. Field of the Invention

The present invention relates to lithium batteries. More particularly, the invention relates to organic electrolyte solutions including silane compounds and to lithium batteries employing the organic electrolyte solutions.

2. Description of the Related Art

Portable electronic devices, such as video cameras, cellular phones, and notebook PCs, are being developed to be more light-weight and to have higher performance. As such, much research into batteries used as driving power sources has been conducted. In particular, re-chargeable (secondary) lithium batteries have been actively studied since they can be rapidly re-charged and have energy densities per unit weight three times greater than those of conventional lead storage batteries, nickel-cadmium batteries, nickel hydrogen batteries, nickel zinc batteries, etc.

Conventional lithium batteries are operated at high operating voltages, and thus, conventional aqueous electrolyte solutions cannot be used due to the vigorous reaction of the aqueous solutions with the lithium used as the anodes. Accordingly, organic electrolyte solutions obtained by dissolving lithium salts in organic solvents are used in lithium batteries. At this time, it is preferable to use organic solvents having high ion conductivities, high dielectric constants, and low viscosities. However, it is difficult to obtain a single organic solvent satisfying all these requirements, and thus, the use of mixed solvents has been proposed, such as a mixed solvent including both a high dielectric constant organic solvent and a low dielectric constant organic solvent, a mixed solvent including a high dielectric constant organic solvent and a low viscosity organic solvent, and the like.

When a carbonate-based non-aqueous polar solvent is used in a lithium secondary battery, excess charges are used due to the reaction between the carbon of the anode and the electrolyte solution during initial charging. Such an irreversible reaction forms a passivation layer, such as a solid electrolyte interface (SEI) film, on a surface of the anode. The SEI film serves to prevent further decomposition of the electrolyte solution and maintains stable charging/discharging. The SEI film also serves as an ion tunnel through which only lithium ions pass. That is, the SEI film prevents the cointercalation of lithium ions with the organic solvents that solvate the lithium ions and move together with the lithium ions into the carbon anode. This prevents the degradation of the anode structure.

However, the SEI film gradually cracks and delaminates from the surface of the electrode due to volumetric expansion and shrinkage of the active material during the charge/discharge cycles of the battery. As a result, the electrolyte directly contacts the active material, thus continuously decomposing the electrolyte. Once the SEI film cracks, the crack continuously extends during charging/discharging of the battery, thereby degrading the active material. In particular, when the active material contains metal, such as silicon, the active material degrades further due to great volumetric changes during charge/discharge cycles. Furthermore, the repeated volumetric shrinkage and expansion of the active material cause the agglomeration of silicon particles.

To address these problems, various compounds having characteristic structures capable of making denser and more rigid SEI films have been proposed. For example, a method of preventing the decomposition of a solvent has been proposed whereby a vinylene carbonate derivative is added as an additive to an electrolyte solution and a film is formed on the surface of the anode through a reduction/decomposition reaction of the additive. Vinylene carbonate has a structure similar to ethylene carbonate but contains a double bond. Thus, vinylene carbonate receives electrons at high voltages, disrupting the double bond in the vinylene carbonate molecule, thereby creating radicals and initiating polymerization. That is, vinylene carbonate provides a polymer through an electrochemical polymerization reaction. The thus-prepared polymer forms a nonconductive film on the surface of the anode, thereby more effectively preventing contact between the anode and the solvent.

Electrolyte solutions including vinyl sulfone, etc. have also been proposed. When a double bond in the vinyl sulfone, etc. is disrupted by reduction, radical polymerization is initiated, thereby forming a film on a surface of the anode.

Organic electrolyte solutions for lithium batteries including at least one silane compound as an additive have also been proposed.

SUMMARY OF THE INVENTION

In one embodiment of the present invention, an organic electrolyte solution can prevent direct contact between a metal active material and an electrolyte, thereby improving battery reliability and enhancing the capacity retention ratio.

In another embodiment of the present invention, a lithium battery using the organic electrolyte solution has improved charge/discharge characteristics.

According to one embodiment of the present invention, an organic electrolyte solution includes a lithium salt, an organic solvent, and a silane compound additive represented by Formula 1 or Formula 2 below.

Formula 1

In Formula 1, X is selected from substituted or unsubstituted $C_1$ to $C_6$ alkylene groups, substituted or unsubstituted $C_6$ to $C_{30}$ cycloalkylene groups, substituted or unsubstituted $C_6$ to $C_{30}$ arylene groups, substituted or unsubstituted $C_2$ to $C_{30}$ heteroarylene groups, and substituted or unsubstituted $C_2$ to $C_{30}$ alkenylene groups. $R_1$ and $R_2$ are each independently selected from substituted or unsubstituted $C_1$ to $C_{20}$ alkyl groups, substituted or unsubstituted $C_3$ to $C_{20}$ cycloalkyl groups, substituted or unsubstituted $C_5$ to $C_{30}$ heterocycloalkyl groups, substituted or unsubstituted $C_1$ to $C_{20}$ alkoxy groups, substituted or unsubstituted $C_6$ to $C_{30}$ aryl groups, substituted or unsubstituted $C_6$ to $C_{30}$ aralkyl groups, and substituted or unsubstituted $C_2$ to $C_{30}$ heteroaryl groups.

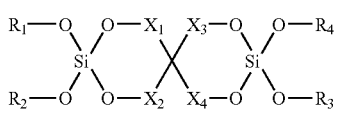

Formula 2

In Formula 2, $X_1$, $X_2$, $X_3$ and $X_4$ are each independently selected from single bonds, substituted or unsubstituted $C_1$ to $C_6$ alkylene groups, substituted or unsubstituted $C_6$ to $C_{30}$ cycloalkylene groups, substituted or unsubstituted $C_6$ to $C_{30}$ arylene groups, substituted or unsubstituted $C_2$ to $C_{30}$ heteroarylene groups, and substituted or unsubstituted $C_2$ to $C_{30}$ alkenylene groups. $R_1$, $R_2$, $R_3$ and $R_4$ are each independently selected from substituted or unsubstituted $C_1$ to $C_{20}$ alkyl groups, substituted or unsubstituted $C_3$ to $C_{20}$ cycloalkyl groups, substituted or unsubstituted $C_5$ to $C_{30}$ heterocycloalkyl groups, substituted or unsubstituted $C_1$ to $C_{20}$ alkoxy groups, substituted or unsubstituted $C_6$ to $C_{30}$ aryl groups, substituted or unsubstituted $C_6$ to $C_{30}$ aralkyl groups, and substituted or unsubstituted $C_2$ to $C_{30}$ heteroaryl groups.

According to an embodiment of the present invention, the silane compound may be present in an amount ranging from about 0.5 to about 20 parts by weight based on 100 parts by weight of the organic solvent.

According to another embodiment of the present invention, the concentration of the lithium salt in the organic electrolyte solution may range from about 0.5 to about 2.0 M.

According to another embodiment of the present invention, the organic solvent may include a high dielectric constant solvent and a low boiling point solvent.

According to another embodiment of the present invention, a lithium battery includes a cathode, an anode, and an organic electrolyte solution including a lithium salt, an organic solvent, and a silane compound represented by Formula 1 or Formula 2 below.

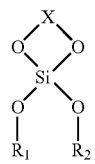

Formula 1

In Formula 1, X is selected from substituted or unsubstituted $C_1$ to $C_6$ alkylene groups, substituted or unsubstituted $C_6$ to $C_{30}$ cycloalkylene groups, substituted or unsubstituted $C_6$ to $C_{30}$ arylene groups, substituted or unsubstituted $C_2$ to $C_{30}$ heteroarylene groups, and substituted or unsubstituted $C_2$ to $C_{30}$ alkenylene groups. $R_1$ and $R_2$ are each independently selected from substituted or unsubstituted $C_1$ to $C_{20}$ alkyl groups, substituted or unsubstituted $C_3$ to $C_{20}$ cycloalkyl groups, substituted or unsubstituted $C_5$ to $C_{30}$ heterocycloalkyl groups, substituted or unsubstituted $C_1$ to $C_{20}$ alkoxy groups, substituted or unsubstituted $C_6$ to $C_{30}$ aryl groups, substituted or unsubstituted $C_6$ to $C_{30}$ aralkyl groups, and substituted or unsubstituted $C_2$ to $C_{30}$ heteroaryl groups.

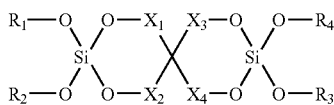

Formula 2

In Formula 2, $X_1$, $X_2$, $X_3$ and $X_4$ are each independently selected from single bonds, substituted or unsubstituted $C_1$ to $C_6$ alkylene groups, substituted or unsubstituted $C_6$ to $C_{30}$ cycloalkylene groups, substituted or unsubstituted $C_6$ to $C_{30}$ arylene groups, substituted or unsubstituted $C_2$ to $C_{30}$ heteroarylene groups, and substituted or unsubstituted $C_2$ to $C_{30}$ alkenylene groups. $R_1$, $R_2$, $R_3$ and $R_4$ are each independently selected from substituted or unsubstituted $C_1$ to $C_{20}$ alkyl groups, substituted or unsubstituted $C_3$ to $C_{20}$ cycloalkyl groups, substituted or unsubstituted $C_5$ to $C_{30}$ heterocycloalkyl groups, substituted or unsubstituted $C_1$ to $C_{20}$ alkoxy groups, substituted or unsubstituted $C_6$ to $C_{30}$ aryl groups, substituted or unsubstituted $C_6$ to $C_{30}$ aralkyl groups, and substituted or unsubstituted $C_2$ to $C_{30}$ heteroaryl groups.

BRIEF DESCRIPTION OF THE DRAWINGS

The above and other features and advantages of the present invention will become more apparent by reference to the following detailed description when considered in conjunction with the attached drawings in which.

DETAILED DESCRIPTION OF THE INVENTION

Figure 1:
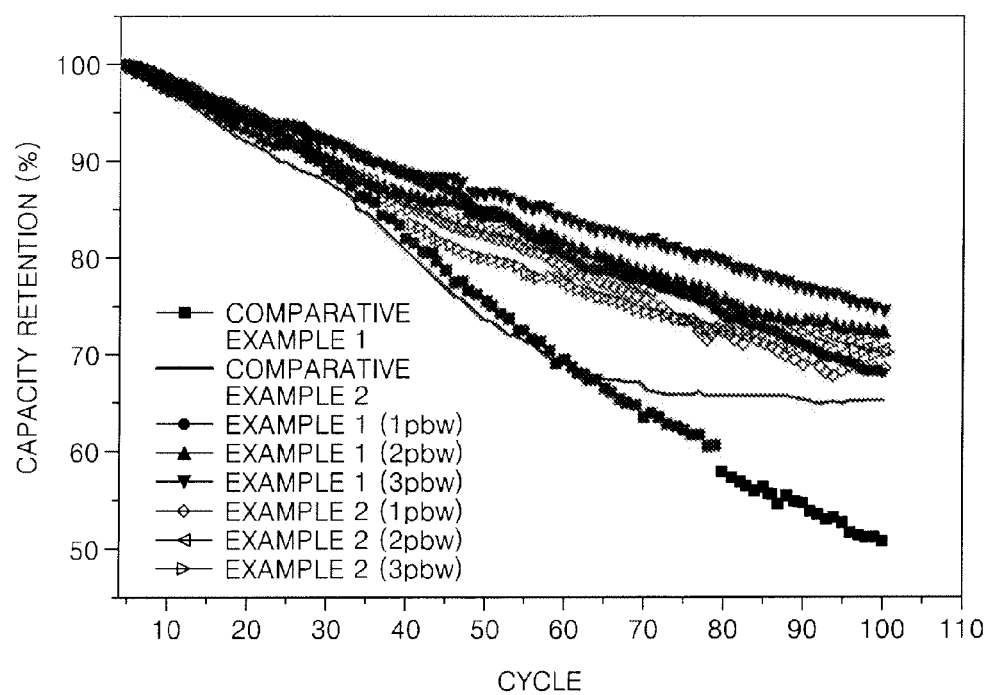
FIG. 1 is a graph comparing the capacity retention ratios of lithium batteries employing organic electrolyte solutions prepared according to Examples 1 and 2 and Comparative Examples 1 and 2.

According to one embodiment of the present invention, an organic electrolyte solution includes a new silane compound. In another embodiment, a lithium battery employs the organic electrolyte solution.

An organic electrolyte solution according to one embodiment of the present invention prevents crack formation caused by volumetric changes in the anode active material during charging/discharging of the battery. This improves charge/discharge characteristics, resulting in improved battery stability, reliability, and charge/discharge efficiency.

A silane compound according to one embodiment of the present invention is structured such that one side of the silane compound includes an alkoxy group directly connected to a silicon atom, and the other side includes a hydrocarbon ring in which a ring carbon atom is connected to the silicon atom via an oxygen atom. In one embodiment, for example, the silane compound may be represented by Formula 1 or Formula 2 below.

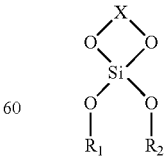

Formula 1

In Formula 1, X is selected from substituted or unsubstituted $C_1$ to $C_6$ alkylene groups, substituted or unsubstituted $C_6$ to $C_{30}$ cycloalkylene groups, substituted or unsubstituted $C_6$ to $C_{30}$ arylene groups, substituted or unsubstituted $C_2$ to $C_{30}$ heteroarylene groups, and substituted or unsubstituted $C_2$ to $C_{30}$ alkenylene groups. $R_1$ and $R_2$ are each independently selected from substituted or unsubstituted $C_1$ to $C_{20}$ alkyl groups, substituted or unsubstituted $C_3$ to $C_{20}$ cycloalkyl groups, substituted or unsubstituted $C_5$ to $C_{30}$ heterocycloalkyl groups, substituted or unsubstituted $C_1$ to $C_{20}$ alkoxy groups, substituted or unsubstituted $C_6$ to $C_{30}$ aryl groups, substituted or unsubstituted $C_6$ to $C_{30}$ aralkyl groups, and substituted or unsubstituted $C_2$ to $C_{30}$ heteroaryl groups.

Formula 2

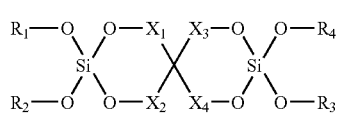

In Formula 2, $X_1$, $X_2$, $X_3$ and $X_4$ are each independently selected from single bonds, substituted or unsubstituted $C_1$ to $C_6$ alkylene groups, substituted or unsubstituted $C_6$ to $C_{30}$ cycloalkylene groups, substituted or unsubstituted $C_6$ to $C_{30}$ arylene groups, substituted or unsubstituted $C_2$ to $C_{30}$ heteroarylene groups, and substituted or unsubstituted $C_2$ to $C_{30}$ alkenylene groups. $R_1$, $R_2$, $R_3$ and $R_4$ are each independently selected from substituted or unsubstituted $C_1$ to $C_{20}$ alkyl groups, substituted or unsubstituted $C_3$ to $C_{20}$ cycloalkyl groups, substituted or unsubstituted $C_5$ to $C_{30}$ heterocycloalkyl groups, substituted or unsubstituted $C_1$ to $C_{20}$ alkoxy groups, substituted or unsubstituted $C_6$ to $C_{30}$ aryl groups, substituted or unsubstituted $C_6$ to $C_{30}$ aralkyl groups, and substituted or unsubstituted $C_2$ to $C_{30}$ heteroaryl groups.

In Formulae 1 and 2 above, the aryl group may be a monovalent aromatic ring system and may include two or more ring systems. The two or more ring systems may be attached to each other or fused. The heteroaryl group may be an aryl group in which at least one carbon atom is substituted by at least one atom selected from N, O, S, and P.

The cycloalkyl group may be an alkyl group having a ring system, and the heterocycloalkyl group may be a cycloalkyl group in which at least one carbon atom is substituted by at least one atom selected from N, O, S, and P.

In Formulae 1 and 2 above, the alkyl group, the alkoxy group, the aryl group, the heteroaryl group, the cycloalkyl group, and the heterocycloalkyl group may be substituted with at least one substituent selected from —F; —Cl; —Br; —CN; —NO$_2$; —OH; unsubstituted $C_1$ to $C_{20}$ alkyl groups; $C_1$ to $C_{20}$ alkyl groups substituted with —F, —Cl, —Br, —CN, —NO$_2$, or —OH; unsubstituted $C_1$ to $C_{20}$ alkoxy groups; $C_1$ to $C_{20}$ alkoxy groups substituted with —F, —Cl, —Br, —CN, —NO$_2$, or —OH; unsubstituted $C_6$ to $C_{30}$ aryl groups; $C_6$ to $C_{30}$ aryl groups substituted with —F, —Cl, —Br, —CN, —NO$_2$, or —OH; unsubstituted $C_2$ to $C_{30}$ heteroaryl groups; $C_2$ to $C_{30}$ heteroaryl groups substituted with —F, —Cl, —Br, —CN, —NO$_2$, or —OH; unsubstituted $C_5$ to $C_{20}$ cycloalkyl groups; $C_5$ to $C_{20}$ cycloalkyl groups substituted with —F, —Cl, —Br, —CN, —NO$_2$, or —OH; unsubstituted $C_5$ to $C_{30}$ heterocycloalkyl groups; and $C_5$ to $C_{30}$ heterocycloalkyl groups substituted with —F, —Cl, —Br, —CN, —NO$_2$, or —OH.

In on embodiment, in Formula 1 above, X may be selected from straight, branched, or cyclic alkyl, alkenyl, or alkynyl groups of 1 to 6 carbon atoms. $R_1$ and $R_2$ may each independently be selected from straight, branched, or cyclic alkyl groups of 1 to 4 carbon atoms.

According to one embodiment, in Formula 2 above, $X_1$, $X_2$, $X_3$, and $X_4$ may each independently be selected from single bonds or straight, branched, or cyclic alkyl, alkenyl, or alkynyl groups of 1 to 4 carbon atoms. $R_1$, $R_2$, $R_3$, and $R_4$ may each independently be selected from straight, branched, or cyclic alkyl groups of 1 to 4 carbon atoms.

According to one embodiment of the present invention, the alkoxy group directly connected to the silicon atom in the silane compound reacts with a hydroxyl group, etc. present on the surface of the active material. Thus, the silane compound is chemically adsorbed onto the surface of the active material by a covalent bond. For example, the silane compound, together with a metal active material, may form a M-O—Si—R linkage where M is the metal active material and R is a substituent. Through the chemical adsorption, the silane compound can form a monolayer on the surface of the active material.

The hydrocarbon ring structure including the silicon atom and the oxygen atom in the silane compound according to one embodiment of the present invention has an affinity with lithium ions. Thus, the hydrocarbon ring structure captures lithium ions and facilitates diffusion of the electrolyte and the lithium ions into the silane compound monolayer. As such, although the monolayer (a kind of a passivation layer) made of the silane compound is present on a surface of the active material, the charge/discharge rate of lithium is not significantly affected due to the easy diffusion of lithium ions into the monolayer.

The silane compound of Formula 2 has an interconnected structure of two hydrocarbon rings. It is expected that the hydrocarbon ring structure intended for forming a SEI film and covering a surface of the electrode can prevent or reduce crack formation on the surface of the electrode.

Therefore, the silane compound monolayer can prevent direct contact between the active material and the electrolyte. That is, the silane compound monolayer can prevent crack formation caused by volumetric changes in the anode active material during lithium intercalation/deintercalation.

An organic electrolyte solution according to an embodiment of the present invention includes a lithium salt, an organic solvent, and a silane compound represented by Formula 1 or Formula 2 above.

In an organic electrolyte solution according to one embodiment, the silane compound may be present in an amount ranging from about 0.5 to about 20 parts by weight based on 100 parts by weight of the organic solvent. In another embodiment, the silane compound may be present in an amount ranging from about 1 to about 15 parts by weight based on 100 parts by weight of the organic solvent. If the silane compound is present in an amount exceeding about 20 parts by weight, charge/discharge characteristics may deteriorate due to a shortage of effective material influencing the performance of the battery. On the other hand, if the silane compound is present in an amount less than about 0.5 parts by weight, it may be difficult to sufficiently achieve the desired effect.

In an organic electrolyte solution according to another embodiment, the organic solvent may include a high dielectric constant solvent and a low boiling point solvent. The high dielectric constant solvent is not particularly limited and may be any such solvent commonly used in the pertinent art. Nonlimiting examples of suitable high dielectric constant solvents include cyclic carbonates (e.g., ethylene carbonate, propylene carbonate, or butylene carbonate), gamma-butyrolactone, and the like.

The low boiling point solvent may also be any such solvent commonly used in the pertinent art. Nonlimiting examples of suitable low boiling point solvents include non-cyclic carbonates (e.g., dimethyl carbonate, ethylmethyl carbonate, diethyl carbonate, or dipropyl carbonate), dimethoxyethane, diethoxyethane, fatty acid ester derivatives, and the like.

In one embodiment of the present invention, the high dielectric constant solvent and the low boiling point solvent may be mixed in a volume ratio ranging from about 1:1 to about 1:9. If the mixture ratio of the high dielectric constant solvent and the low boiling point solvent is outside this range, discharge capacity and charge/discharge cycle life may be reduced.

The lithium salt is also not limited and may be any lithium salt commonly used in lithium batteries. Nonlimiting examples of suitable lithium salts include $LiClO_4$, $LiCF_3SO_3$, $LiPF_6$, $LiN(CF_3SO_2)$, $LiBF_4$, $LiC(CF_3SO_2)_3$, and $LiN(C_2F_5SO_2)_2$.

In one embodiment, the concentration of the lithium salt in the organic electrolyte solution may range from about 0.5 to about 2M. If the concentration of the lithium salt is less than about 0.5 M, the conductivity of the organic electrolyte solution may be reduced, thereby degrading the performance of the organic electrolyte solution. On the other hand, if the concentration of the lithium salt exceeds about 2.0 M, the viscosity of the organic electrolyte solution may increase, thereby decreasing lithium ion mobility.

Hereinafter, a lithium battery employing an organic electrolyte solution according to the present invention and a method of manufacturing the same will be described.

A lithium battery according to one embodiment of the present invention includes a cathode, an anode, and an organic electrolyte solution according to an embodiment of the present invention. The shape of the lithium battery is not particularly limited. Furthermore, the lithium battery of the present invention may be a lithium primary battery as well as a lithium secondary battery, such as a lithium ion battery, a lithium ion polymer battery, and a lithium sulfur battery.

The lithium battery of the present invention can be manufactured as follows.

First, a cathode active material, a conducting agent, a binder, and a solvent are mixed to prepare a cathode active material composition. The cathode active material composition is coated directly on an aluminum current collector and dried to prepare a cathode plate. Alternatively, the cathode active material composition may be cast on a separate support to form a film, which is then separated from the support and laminated on an aluminum current collector to prepare a cathode plate.

The cathode active material is not limited and may be any lithium-containing metal oxide commonly used in the pertinent art. Nonlimiting examples of suitable cathode active materials include $LiCoO_2$, $LiMn_xO_{2x}$, $LiNi_{x-1}Mn_xO_{2x}$ (where x is 1 or 2), $Ni_{1-x-y}Co_xMn_yO_2$ (where $0 \leq x \leq 0.5$, $0 \leq y \leq 0.5$), and the like.

One nonlimiting example of a suitable conducting agent is carbon black. Nonlimiting examples of suitable binders include vinylidene fluoride/hexafluoropropylene copolymers, polyvinylidenefluoride, polyacrylonitrile, polymethylmethacrylate, polytetrafluoroethylene, styrene butadiene rubber-based polymers, and mixtures thereof. Nonlimiting examples of suitable solvents include N-methylpyrrolidone, acetone, water, and the like. The cathode active material, the conducting agent, the binder, and the solvent are each used in an amount commonly used in lithium batteries.

An anode plate is prepare in a manner similar to the above-described preparation of the cathode plate. That is, an anode active material, a conducting agent, a binder, and a solvent are mixed to prepare an anode active material composition. The anode active material composition is coated directly on a copper current collector to form an anode plate. Alternatively, the anode active material composition is cast on a separate support to form a film which is then separated from the support and laminated on a copper current collector to prepare an anode plate. The anode active material, the conducting agent, the binder, and the solvent are each used in an amount commonly used in lithium batteries.

Nonlimiting examples of suitable anode active materials include silicon metal, silicon thin films, lithium metal, lithium alloys, carbonaceous materials, and graphite. The conducting agent, the binder, and the solvent in the anode active material composition are the same as those in the cathode active material composition. In some embodiments, the cathode active material composition and the anode active material composition may further include a plasticizer to form pores in the electrode plates.

Any separator commonly used in lithium batteries may be used. In particular, a separator having low resistance to ion mobility of the electrolyte and good electrolyte impregnation properties may be used. For example, the separator may be made of a material selected from glass fiber, polyester, Teflon, polyethylene, polypropylene, polytetrafluoroethylene (PTFE), and combinations thereof. The separator may also be made of a woven or non-woven material. In more detail, a coilable separator made of a material such as polyethylene or polypropylene may be used in lithium ion batteries, and a separator having good organic electrolyte impregnation properties may be used in lithium ion polymer batteries. These separators can be manufactured as follows.

A polymer resin, a filler, and a solvent are mixed to prepare a separator composition. The separator composition is directly coated on an electrode and dried to form a separator film. Alternatively, the separator composition is cast on a separate support and dried to form a separator film which is separated from the support and laminated on an electrode.

The polymer resin is not particularly limited, and may be selected from any binder materials used in electrode plates. Nonlimiting examples of suitable polymer resins include vinylidenefluoride/hexafluoropropylene copolymers, polyvinylidenefluoride, polyacrylonitrile, polymethylmethacrylate, and mixtures thereof. In one embodiment, a vinylidenefluoride/hexafluoropropylene copolymer containing from about 8 to about 25 wt % hexafluoropropylene is used.

Figure 4:
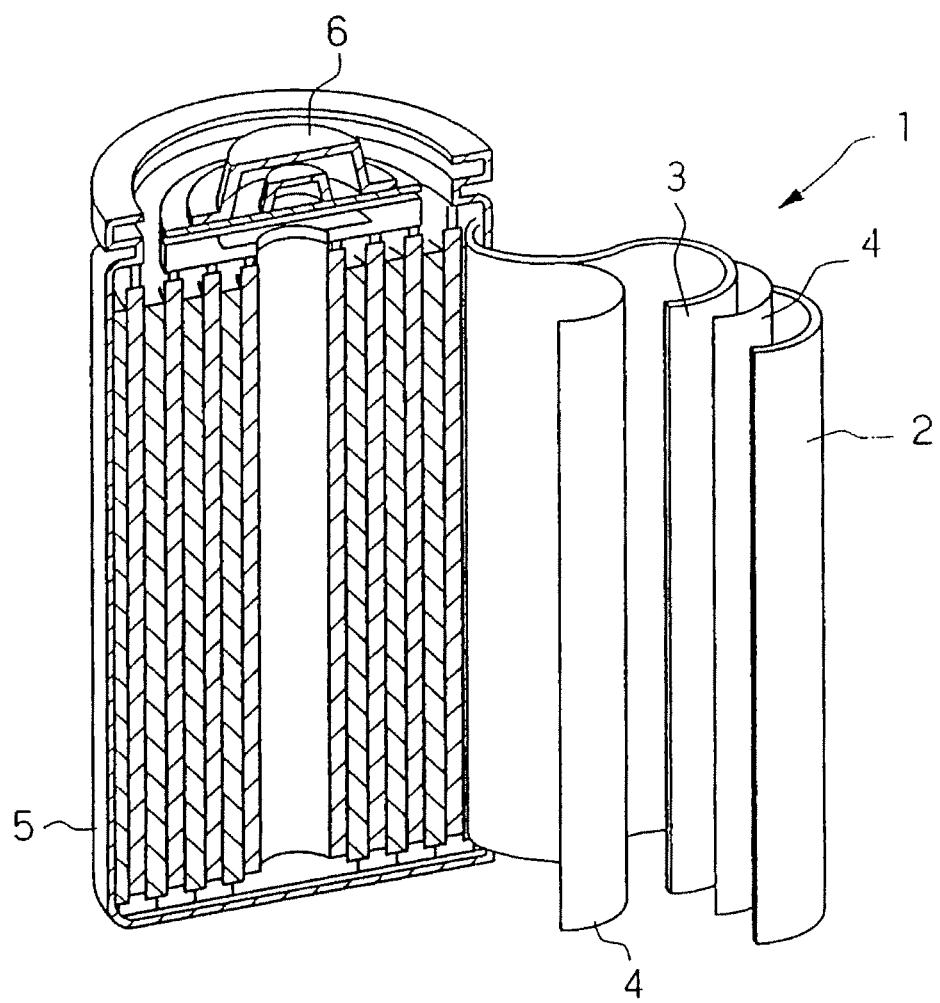
FIG. 4 is a schematic cross-sectional view of lithium battery according to one embodiment of the present invention.

As shown in FIG. 4, the separator 4 is disposed between the cathode plate 2 and anode plate 3 to form a battery structure. The battery structure is wound or folded and encased in a cylindrical or square battery case 5 and sealed with a cap assembly 6. An organic electrolyte solution according to an embodiment of the present invention is then injected into the case to complete a lithium ion battery 1.

Alternatively, the battery structure is stacked in the form of a bicell structure and impregnated with an organic electrolyte solution according to an embodiment of the present invention. The resultant structure is received in a pouch and sealed to complete a lithium ion polymer battery.

Hereinafter, the present invention will be described with reference to the following examples. However, it is understood that the following examples are presented for illustrative purposes only and are not intended to limit the scope of the invention.

Synthesis Example 1

2,2-dimethoxy-1,3,2-dioxasilaphane 1,4-butanediol and tetramethylorthosilicate were incubated at room temperature in the presence of t-BuOK (1.5 wt % in methanol) for 1-2 hours to distill methanol and the resultant polymer compound was thermally decomposed under vacuum of 2-4 mmHg at 120° C. for one hour to give 2,2-dimethoxy-1,3,2-dioxasilaphane represented by Formula 3 below.

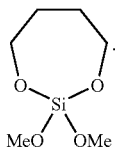

Formula 3

Synthesis Example 2

2,2-diethoxy-1,3,2-dioxasilaphane 2,2-diethoxy-1,3,2-dioxasilaphane represented by Formula 4 below was synthesized as in Synthesis Example 1 except that tetraethylorthosilicate was used instead of tetramethylorthosilicate:

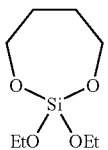

Formula 4

Synthesis Example 3

3,3,9,9-tetramethoxy-2,4,8,10-tetraoxa-3,9-disilapiro[5.5]undecane

Pentaerythritol and tetramethylorthosilicate were incubated at 115° C. in the presence of t-BuOK for 2.5 hours to give 3,3,9,9-tetramethoxy-2,4,8,10-tetraoxa-3,9-disilapiro[5.5]undecane represented by Formula 5 below:

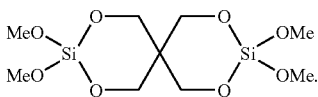

Formula 5

Synthesis Example 4

3,3,9,9-tetraethoxy-2,4,8,10-tetraoxa-3,9-disilapiro[5.5]undecane

Pentaerythritol and tetraethylorthosilicate were incubated at 150° C. in the presence of t-BuOK for 2.5 hours to give 3,3,9,9-tetraethoxy-2,4,8,10-tetraoxa-3,9-disilapiro[5.5]undecane represented by Formula 6 below:

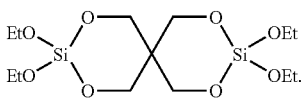

Formula 6

Synthesis Example 5

2,2-diethoxy-4,7-dihydro-1,3,2-dioxasilaphane

Cis-2-butene-1,4-diol and tetraethylorthosilicate were incubated at room temperature in the presence of t-BuOK (0.5-1.5 wt % in ethanol) to remove ethanol, and the resultant polymer compound was thermally decomposed under vacuum at 120-140° C. to give 2,2-diethoxy-4,7-dihydro-1,3,2-dioxasilaphane represented by Formula 7 below:

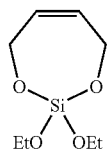

Formula 7

Example 1

Preparation of Electrolyte Solution

An organic electrolyte solution was prepared by adding the 2,2-dimethoxy-1,3,2-dioxasilaphane of Synthesis Example 1 as an additive to a mixed organic solvent including 30 vol % of ethylene carbonate and 70 vol % of diethyl carbonate. Three solutions were prepared in which the 2,2-dimethoxy-1,3,2-dioxasilaphane was added in amounts of 1, 2, and 3 parts by weight based on 100 parts by weight of the organic solvent. 1.3M $LiPF_6$ was used as a lithium salt.

Manufacture of Lithium Ion Batteries

A silicon/graphite composite was used as the anode material. For this, 1 g of silicon powder having an average particle size of 2 μm and 2 g of graphite powder having an average particle size of 6 μm were mixed in a mortar, and the resultant mixture, together with 20 g of steel balls, was placed in a stainless milling chamber and mechanically milled with a SPEX mill 8000M for one hour to obtain a silicon/graphite composite. The silicon/graphite composite, carbon black as a conducting agent, and PVDF (polyvinylidene fluoride) as a binder were weighed in a ratio of 75:15:10 and mixed in a mortar, and NMP (N-methylpyrrolidone) was added thereto to make slurries. Each slurry was coated on a copper foil having a thickness of 20 μm, dried at 85° C., and vacuum-dried at 120° C. for three hours to obtain an anode.

95 wt % of lithium cobalt oxide ($LiCoO_2$) powder having an average particle size of 20 μm and 3 wt % of amorphous carbon powder as cathode active materials, 2 wt % of PVdF as a binder, and NMP were mixed to make slurries. Each slurry was coated on an aluminum foil having a thickness of 15 μm and vacuum-dried in a 120° C. oven for about 10 hours to obtain a cathode.

Pouch cells (2 cm×3 cm) were manufactured using the above-manufactured cathodes and anodes, separators, and the above-prepared organic electrolyte solutions.

Example 2

Organic electrolyte solutions and lithium ion batteries were prepared as in Example 1 except that the 2,2-diethoxy- 1,3,2-dioxasilaphane of Synthesis Example 2 was used instead of the 2,2-dimethoxy-1,3,2-dioxasilaphane of Synthesis Example 1.

Example 3

Organic electrolyte solutions and lithium ion batteries were prepared as in Example 1 except that the 3,3,9,9-tetramethoxy-2,4,8,10-tetraoxa-3,9-disilapiro[5.5]undecane of Synthesis Example 3 was used instead of the 2,2-dimethoxy-1,3,2-dioxasilaphane of Synthesis Example 1.

Example 4

Organic electrolyte solutions and lithium ion batteries were prepared as in Example 1 except that the 3,3,9,9-tetraethoxy-2,4,8,10-tetraoxa-3,9-disilapiro[5.5]undecane of Synthesis Example 4 was used instead of the 2,2-dimethoxy-1,3,2-dioxasilaphane of Synthesis Example 1.

Example 5

Organic electrolyte solutions and lithium ion batteries were prepared as in Example 1 except that the 2,2-diethoxy-4,7-dihydro-1,3,2-dioxasilaphane of Synthesis Example 5 was used instead of the 2,2-dimethoxy-1,3,2-dioxasilaphane of Synthesis Example 1.

Comparative Example 1

An organic electrolyte solution was prepared using a mixed organic solvent including 30 vol % of ethylene carbonate and 70 vol % of diethyl carbonate and 1.3 M LiPF$_6$ as a lithium salt. No additive was used.

Lithium ion batteries were manufactured as in Example 1 except that the organic electrolyte solution according to Comparative Example 1 was used.

Comparative Example 2

An organic electrolyte solution was prepared by adding 3 wt % of vinyl triethoxy silane represented by Formula 8 below as an additive to a mixed organic solvent including 30 vol % of ethylene carbonate and 70 vol % of diethyl carbonate. 1.3 M LiPF$_6$ was used as a lithium salt.

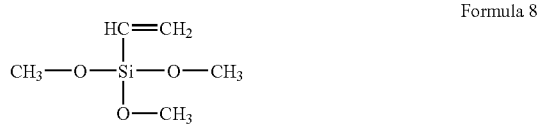

Formula 8

Lithium ion batteries were manufactured as in Example 1 except that the organic electrolyte solution prepared according to Comparative Example 2 was used.

Experimental Example 1

Charge/Discharge Characteristics Test of Batteries

Each of the lithium ion batteries manufactured according to Examples 1-5 and Comparative Examples 1-2 was subjected to a constant-current charge at a 0.5C rate until the cell voltage reached 4.2 V. Then, each battery was charged at a constant voltage of 4.2V until the current was reduced to 0.05C. Then, a constant-current discharge was performed at a 0.5C rate until the voltage reached 3.0V to thereby obtain charge/discharge capacities. Cycle life tests for the batteries were performed under the above-described conditions, and capacity retention ratios were calculated. The capacity retention ratios were calculated using Equation 1 below.

Capacity retention ratio(%)=(discharge capacity at $100^{th}$ cycle/discharge capacity at $5^{th}$ cycle)×100     Equation 1

The experimental results are summarized in Table 1 below and in FIGS. 1 and 2.

TABLE 1

| Sample | Capacity at $1^{st}$ cycle (mAh) | Capacity at $5^{th}$ cycle (mAh) | Capacity at $100^{th}$ cycle (mAh) | Capacity retention ratio (%) |
|---|---|---|---|---|
| Comparative Example 1 | 19 | 17.6 | 9 | 51 |
| Comparative Example 2 | 19 | 17 | 11 | 65 |
| Example 1 (1 pbw) | 19 | 17.6 | 12 | 68 |
| Example 1 (2 pbw) | 19 | 18.1 | 13 | 72 |
| Example 1 (3 pbw) | 19 | 17.3 | 13 | 75 |
| Example 2 (1 pbw) | 19 | 17.4 | 12 | 69 |
| Example 2 (2 pbw) | 19 | 16.9 | 12 | 71 |
| Example 2 (3 pbw) | 19 | 17.1 | 12 | 70 |
| Example 3 (1 pbw) | 19 | 17.5 | 10 | 57 |
| Example 3 (2 pbw) | 19 | 17.4 | 12 | 69 |
| Example 3 (3 pbw) | 19 | 17.1 | 12 | 70 |
| Example 4 (1 pbw) | 19 | 18.4 | 9 | 49 |
| Example 4 (2 pbw) | 18 | 17.6 | 12 | 68 |
| Example 4 (3 pbw) | 19 | 18.2 | 12 | 66 |
| Example 5 (3 pbw) | 18.6 | 16.7 | 9 | 54 | pbw: parts by weight

Figure 2:
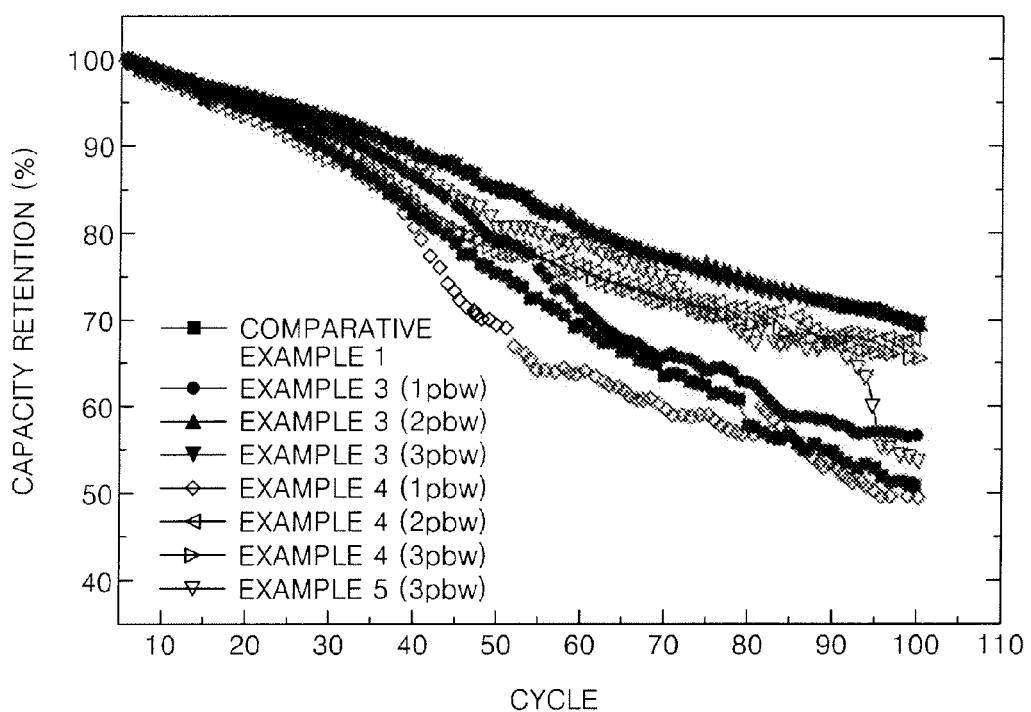
FIG. 2 is a graph comparing the capacity retention ratios of lithium batteries employing organic electrolyte solutions prepared according to Examples 3 through 5 and Comparative Example 1.

Referring to FIGS. 1 and 2, the charge/discharge efficiencies at the $1^{st}$ and $100^{th}$ cycles of the batteries manufactured according to Examples 1-5 were 10-20% greater than those of the batteries manufactured according to Comparative Example 1 (electrolyte with no additive). The capacity retention ratios of the batteries manufactured according to Examples 1-5 were 5-12% greater than those of the batteries manufactured according to Comparative Example 2 (electrolyte using a vinyl triethoxysilane additive). These results show that the silane compounds of the present invention effectively prevent crack formation caused by volumetric changes of the metal active material upon charging/discharging. The results also show that the silane compounds of the present invention induce reversible intercalation/deintercalation of lithium ions, thereby enhancing cycle life.

Example 7

Preparation of Electrolyte Solution

An organic electrolyte solution was prepared by adding the 2,2-diethoxy-1,3,2-dioxasilaphane of Synthesis Example 2 as an additive to a mixed organic solvent including 30 vol % of ethylene carbonate and 70 vol % of diethyl carbonate. Three solutions were prepared in which the additive was added in amounts of 1, 3, and 5 parts by weight based on 100 parts by weight of the organic solvent. 1.3 M LiPF$_6$ was used as a lithium salt.

Manufacture of Lithium Ion Batteries

Silicon thin films were used as anode materials. Each silicon thin film was manufactured by depositing amorphous silicon on the surface of a rolled copper foil (20 μm in thickness) using RF sputtering (radio frequency sputtering). Each thin film electrode had a thickness of 0.15 μm.

Lithium electrodes were manufactured as opposite electrodes. Each lithium electrode was manufactured by pressing metal lithium having a thickness of 500 μm on a copper foil having a thickness of 20 μm. Pouch cells (1 cm×2 cm) were manufactured using the anodes, separators, the lithium electrodes used as the opposite electrodes, and the organic electrolyte solution prepared according to Example 7.

Example 8

Organic electrolyte solutions and lithium ion batteries were prepared as in Example 7 except that the 3,3,9,9-tetraethoxy-2,4,8,10-tetraoxa-3,9-disilapiro[5.5]undecane of Synthesis Example 4 was used instead of the 2,2-diethoxy-1,3,2-dioxasilaphane of Synthesis Example 2.

Example 9

Organic electrolyte solutions and lithium ion batteries were prepared as in Example 7 except that the 2,2-diethoxy-4,7-dihydro-1,3,2-dioxasilaphane of Synthesis Example 5 was used instead of the 2,2-diethoxy-1,3,2-dioxasilaphane of Synthesis Example 2.

Comparative Example 4

Lithium ion batteries were manufactured as in Example 7 except that the organic electrolyte solution prepared according to Comparative Example 1 was used.

Experimental Example 2

Charge/Discharge Characteristics Test of Batteries

Charge/discharge characteristics of each of the lithium ion batteries manufactured according to Examples 7-9 and Comparative Example 4 were tested. A constant-current charge was performed on the Li electrode at a current of 147 uA per 1 g of active material until the voltage reached 0.01V. Then, each battery was charged at a constant voltage of 0.01V until the current was reduced to 15 μA per 1 g of active material. Discharge was performed at a constant current of 147 μA until the voltage reached 1.5V. At the $1^{st}$ through $3^{rd}$ cycles, charge/discharge was performed at a rate of 0.2C to facilitate the formation of a SEI film. From the $4^{th}$ cycle, charge/discharge was performed at a rate of 0.5C. In order to compare cycle life characteristics, a capacity retention ratio of the capacity at the $100^{th}$ cycle to the capacity at the $4^{th}$ cycle was measured and the results are summarized in Table 2 below and in FIG. 3.

TABLE 2

| Sample | Capacity at $1^{st}$ cycle (mAh) | Capacity at $4^{th}$ cycle (mAh) | Capacity at $100^{th}$ cycle (mAh) | Capacity retention ratio (%) |
|---|---|---|---|---|
| Comparative Example 4 | 2398 | 2515 | 981 | 39 |
| Example 7 (1 pbw) | 2622.9 | 2656 | 1699.6 | 64 |
| Example 7 (3 pbw) | 2765.5 | 2803 | 2131.3 | 76 |
| Example 7 (5 pbw) | 2477.3 | 2590 | 1553.8 | 60 |
| Example 8 (1 pbw) | 2483 | 2554 | 1609 | 63 |
| Example 8 (3 pbw) | 2542 | 2647 | 1509 | 57 |
| Example 8 (5 pbw) | 2394 | 2622 | 1547 | 59 |
| Example 9 (3 pbw) | 2808.3 | 2902 | 1756.4 | 60.5 | pbw: parts by weight

Figure 3:
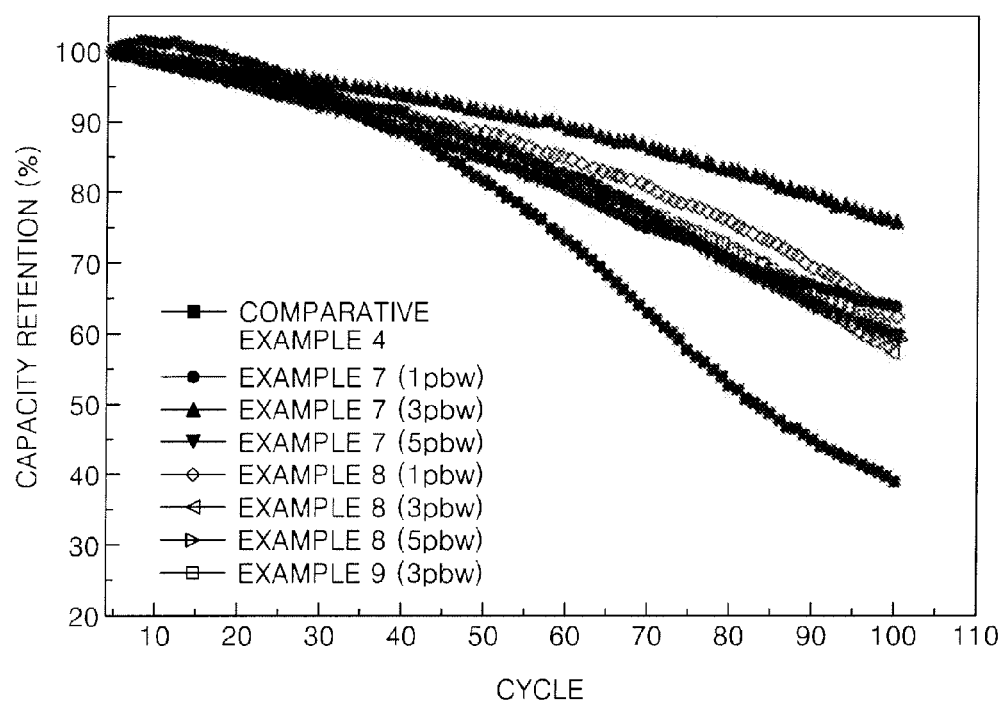
FIG. 3 is a graph comparing the capacity retention ratios of lithium batteries employing organic electrolyte solutions prepared according to Examples 7 through 9 and Comparative Example 4.

Referring to FIG. 3, the charge/discharge efficiencies at the $1^{st}$ and $100^{th}$ cycles of the batteries manufactured according to Examples 7-9 were 20-40% greater than those of the batteries manufactured according to Comparative Example 4 (electrolyte with no additive). Thus, the batteries manufactured according to Examples 7-9 exhibited good capacity retention ratios, which are comparable to the capacity retention ratios of the batteries employing the Si/graphite composite electrodes illustrated in FIGS. 1 and 2. These results show that when a silicon thin film electrode is used, the alkoxy group of a silane compound of the present invention easily binds to the silicon thin film electrode, thereby forming a stable SEI film. This effectively prevents crack formation due to volumetric changes in the metal active material during charging/discharging and enhances the conduction characteristics of lithium ions.

The organic electrolyte solutions according to the present invention use new silane compounds and prevent crack formation caused by volumetric changes in the anode active material during charging/discharging of the battery. This improves charge/discharge characteristics, thereby improving battery stability, reliability, and charge/discharge efficiency, which is a dramatic improvement over conventional organic electrolyte solutions, which have higher irreversible capacities due to the decomposition of polar solvents.

While the present invention has been illustrated and described with reference to certain exemplary embodiments, it will be understood by those of ordinary skill in the art that various modifications and changes may be made to the described embodiments without departing from the spirit and scope of the present invention as defined by the following claims.

What is claimed is:

1. An organic electrolyte solution comprising:
   a lithium salt;
   an organic solvent; and
   a silane compound selected from the group consisting of compounds represented by Formula 1 and 2:

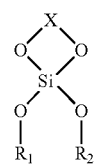

Formula 1

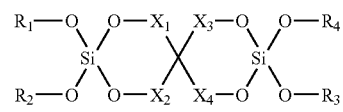

Formula 2 wherein:
   X is selected from the group consisting of unsubstituted $C_1$ to $C_6$ divalent alkyl groups, substituted $C_1$ to $C_6$ divalent alkyl groups, unsubstituted $C_6$ to $C_{30}$ divalent cylcloalkyl groups, substituted $C_6$ to $C_{30}$ divalent cycloalkyl groups, unsubstituted $C_6$ to $C_{30}$ divalent aryl groups, substituted $C_6$ to $C_{30}$ divalent aryl groups, unsubstituted $C_2$ to $C_{30}$ divalent heteroaryl groups, substituted $C_2$ to $C_{30}$ divalent heteroaryl groups, unsubstituted $C_2$ to $C_{30}$ divalent alkenyl groups, substituted $C_2$ to $C_{30}$ divalent alkenyl groups, unsubstituted $C_2$ to $C_6$ divalent alkynyl groups, and substituted $C_2$ to $C_6$ divalent alkynyl groups;

$R_1$, $R_2$, $R_3$ and $R_4$ are each independently selected from the group consisting of unsubstituted $C_1$ to $C_{20}$ alkyl groups, substituted $C_1$ to $C_{20}$ alkyl groups, unsubstituted $C_3$ to $C_{20}$ cycloalkyl groups, substituted $C_3$ to $C_{20}$ cycloalkyl groups, unsubstituted $C_5$ to $C_{30}$ heterocycloalkyl groups, substituted $C_5$ to $C_{30}$ heterocycloalkyl groups, unsubstituted $C_1$ to $C_{20}$ alkoxy groups, substituted $C_1$ to $C_{20}$ alkoxy groups, unsubstituted $C_6$ to $C_{30}$ aryl groups, substituted $C_6$ to $C_{30}$ aryl groups, unsubstituted $C_6$ to $C_{30}$ aralkyl groups, substituted $C_6$ to $C_{30}$ aralkyl groups, unsubstituted $C_2$ to $C_{30}$ heteroaryl groups, and substituted $C_2$ to $C_{30}$ heteroaryl groups; and $X_1$, $X_2$, $X_3$ and $X_4$ are each independently selected from the group consisting of single bonds, unsubstituted $C_1$ to $C_6$ divalent alkyl groups, substituted $C_1$ to $C_6$ divalent alkyl groups, unsubstituted $C_6$ to $C_{30}$ divalent cycloalkyl groups, substituted $C_6$ to $C_{30}$ divalent cycloalkyl groups, unsubstituted $C_6$ to $C_{30}$ divalent aryl groups, substituted $C_6$ to $C_{30}$ divalent aryl groups, unsubstituted $C_2$ to $C_{30}$ divalent heteroaryl groups, substituted $C_2$ to $C_{30}$ divalent heteroaryl groups, unsubstituted $C_2$ to $C_{30}$ divalent alkenyl groups, substituted $C_2$ to $C_{30}$ divalent alkenyl groups, unsubstituted $C_2$ to $C_6$ divalent alkynyl groups, and substituted $C_2$ to $C_6$ divalent alkynyl groups.

2. The organic electrolyte solution of claim 1, wherein the silane compound comprises a compound represented by Formula 1, wherein:

X is selected from the group consisting of straight divalent alkyl groups having from 1 to 6 carbon atoms, straight divalent alkenyl groups having from 2 to 6 carbon atoms, straight divalent alkynyl groups having from 2 to 6 carbon atoms, branched divalent alkyl groups having from 1 to 6 carbon atoms, branched divalent alkenyl groups having from 3 to 6 carbon atoms, branched divalent alkynyl groups having from 3 to 6 carbon atoms, cyclic divalent alkyl groups having from 3 to 6 carbon atoms, cyclic divalent alkenyl groups having from 3 to 6 carbon atoms, and cyclic divalent alkynyl groups having from 4 to 6 carbon atoms; and $R_1$ and $R_2$ are each independently selected from the group consisting of straight alkyl groups having from 1 to 4 carbon atoms, branched alkyl groups having from 3 to 4 carbon atoms, and cyclic alkyl groups having from 3 to 4 carbon atoms.

3. The organic electrolyte solution of claim 1, wherein the silane compound comprises a compound represented by Formula 2, wherein:

$X_1$, $X_2$, $X_3$ and $X_4$ are each independently selected from the group consisting of single bonds, straight divalent alkyl groups having from 1 to 4 carbon atoms, straight divalent alkenyl groups having from 2 to 4 carbon atoms, straight divalent alkynyl groups having from 2 to 4 carbon atoms, branched divalent alkyl groups having from 3 to 4 carbon atoms, branched divalent alkenyl groups having from 3 to 4 carbon atoms, branched divalent alkynyl groups having from 3 to 4 carbon atoms, cyclic divalent alkyl groups having from 3 to 4 carbon atoms, cyclic divalent alkenyl groups having from 3 to 4 carbon atoms, and cyclic divalent alkynyl groups having from 3 to 4 carbon atoms; and $R_1$, $R_2$, $R_3$ and $R_4$ are each independently selected from the group consisting of straight alkyl groups having from 1 to 4 carbon atoms, branched alkyl groups having from 3 to 4 carbon atoms, and cyclic alkyl groups having from 3 to 4 carbon atoms.

4. The organic electrolyte solution of claim 1, wherein the silane compound is selected from the group consisting of compounds represented by Formulae 3, 4, 5, 6 and 7:

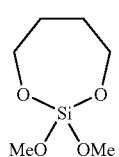

Formula 3

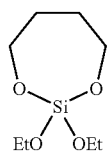

Formula 4

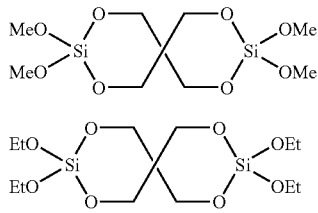

Formula 5

Formula 6

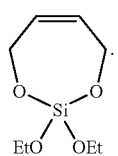

Formula 7

5. The organic electrolyte solution of claim 1, wherein the silane compound is present in an amount ranging from about 0.5 to about 20 parts by weight based on 100 parts by weight of the organic solvent.

6. The organic electrolyte solution of claim 1, wherein the lithium salt is present in a concentration ranging from about 0.5 to about 2.0 M.

7. The organic electrolyte solution of claim 1, wherein the organic solvent comprises a high dielectric constant solvent and a low boiling point solvent.

8. The organic electrolyte solution of claim 7, wherein the high dielectric constant solvent is selected from the group consisting of ethylene carbonate, propylene carbonate, butylene carbonate, gamma butyrolactone, and mixtures thereof.

9. The organic electrolyte solution of claim 7, wherein the low boiling point solvent is selected from the group consisting of dimethyl carbonate, ethylmethyl carbonate, diethyl carbonate, dipropyl carbonate, dimethoxyethane, diethoxyethane, fatty acid ester derivatives, and mixtures thereof.

10. A lithium battery comprising:
a cathode;
an anode; and
an organic electrolyte solution comprising a lithium salt, an organic solvent, and a silane compound selected from the group consisting of compounds represented by Formula 1 and 2:

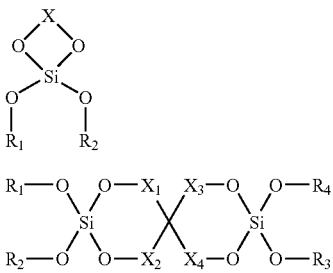

Formula 1

Formula 2 wherein:
  X is selected from the group consisting of unsubstituted $C_1$ to $C_6$ divalent alkyl groups, substituted $C_1$ to $C_6$ divalent alkyl groups, unsubstituted $C_6$ to $C_{30}$ divalent cylcloalkyl groups, substituted $C_6$ to $C_{30}$ divalent cycloalkyl groups, unsubstituted $C_6$ to $C_{30}$ divalent aryl groups, substituted $C_6$ to $C_{30}$ divalent aryl groups, unsubstituted $C_2$ to $C_{30}$ divalent heteroaryl groups, substituted $C_2$ to $C_{30}$ divalent heteroaryl groups, unsubstituted $C_2$ to $C_{30}$ divalent alkenyl groups, substituted $C_2$ to $C_{30}$ divalent alkenyl groups, unsubstituted $C_2$ to $C_6$ divalent alkynyl groups, and substituted $C_2$ to $C_6$ divalent alkynyl groups;
  $R_1$, $R_2$, $R_3$ and $R_4$ are each independently selected from the group consisting of unsubstituted $C_1$ to $C_{20}$ alkyl groups, substituted $C_1$ to $C_{20}$ alkyl groups, unsubstituted $C_3$ to $C_{20}$ cycloalkyl groups, substituted $C_3$ to $C_{20}$ cycloalkyl groups, unsubstituted $C_5$ to $C_{30}$ heterocycloalkyl groups, substituted $C_5$ to $C_{30}$ heterocycloalkyl groups, unsubstituted $C_1$ to $C_{20}$ alkoxy groups, substituted $C_1$ to $C_{20}$ alkoxy groups, unsubstituted $C_6$ to $C_{30}$ aryl groups, substituted $C_6$ to $C_{30}$ aryl groups, unsubstituted $C_6$ to $C_{30}$ aralkyl groups, substituted $C_6$ to $C_{30}$ aralkyl groups, unsubstituted $C_2$ to $C_{30}$ heteroaryl groups, and substituted $C_2$ to $C_{30}$ heteroaryl groups; and
  $X_1$, $X_2$, $X_3$ and $X_4$ are each independently selected from the group consisting of single bonds, unsubstituted $C_1$ to $C_6$ divalent alkyl groups, substituted $C_1$ to $C_6$ divalent alkyl groups, unsubstituted $C_6$ to $C_{30}$ divalent cycloalkyl groups, substituted $C_6$ to $C_{30}$ divalent cycloalkyl groups, unsubstituted $C_6$ to $C_{30}$ divalent aryl groups, substituted $C_6$ to $C_{30}$ divalent aryl groups, unsubstituted $C_2$ to $C_{30}$ divalent heteroaryl groups, substituted $C_2$ to $C_{30}$ divalent heteroaryl groups, unsubstituted $C_2$ to $C_{30}$ divalent alkenyl groups, substituted $C_2$ to $C_{30}$ divalent alkenyl groups, unsubstituted $C_2$ to $C_6$ divalent alkynyl groups, and substituted $C_2$ to $C_6$ divalent alkynyl groups.

11. The lithium battery of claim 10, wherein the silane compound comprises a compound represented by Formula 1, wherein:
  X is selected from the group consisting of straight divalent alkyl groups having from 1 to 6 carbon atoms, straight divalent alkenyl groups having from 2 to 6 carbon atoms, straight divalent alkynyl groups having from 2 to 6 carbon atoms, branched divalent alkyl groups having from 2 to 6 carbon atoms, branched divalent alkenyl groups having from 3 to 6 carbon atoms, branched divalent alkynyl groups having from 3 to 6 carbon atoms, cyclic divalent alkyl groups having from 3 to 6 carbon atoms, cyclic divalent alkenyl groups having from 3 to 6 carbon atoms, and cyclic divalent alkynyl groups having from 4 to 6 carbon atoms; and
  $R_1$ and $R_2$ are each independently selected from the group consisting of straight alkyl groups having from 1 to 4 carbon atoms, branched alkyl groups having from 3 to 4 carbon atoms, and cyclic alkyl groups having from 3 to 4 carbon atoms.

12. The lithium battery of claim 10, wherein the silane compound comprises a compound represented by Formula 2, wherein:
  $X_1$, $X_2$, $X_3$ and $X_4$ are each independently selected from the group consisting of single bonds, straight divalent alkyl groups having from 1 to 4 carbon atoms, straight divalent alkenyl groups having from 2 to 4 carbon atoms, straight divalent alkynyl groups having from 2 to 4 carbon atoms, branched divalent alkyl groups having from 2 to 4 carbon atoms, branched divalent alkenyl groups having from 3 to 4 carbon atoms, branched divalent alkynyl groups having from 3 to 4 carbon atoms, cyclic divalent alkyl groups having from 3 to 4 carbon atoms, cyclic divalent alkenyl groups having from 3 to 4 carbon atoms, and cyclic divalent alkynyl groups having 4 carbon atoms; and
  $R_1$, $R_2$, $R_3$ and $R_4$ are each independently selected from the group consisting of straight alkyl groups having from 1 to 4 carbon atoms, branched alkyl groups having from 3 to 4 carbon atoms, and cyclic alkyl groups having from 3 to 4 carbon atoms.

13. The lithium battery of claim 10, wherein the silane compound is selected from the group consisting of compounds represented by Formulae 3, 4, 5, 6 and 7:

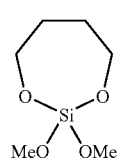

Formula 3

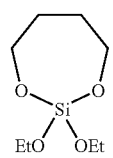

Formula 4

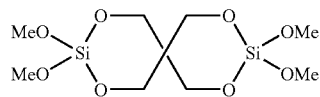

Formula 5

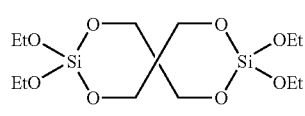

Formula 6

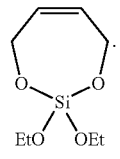

Formula 7

* * * * *